United States Patent
Görl et al.

(10) Patent No.: US 6,822,036 B1
(45) Date of Patent: Nov. 23, 2004

(54) RUBBER POWDERS WHICH CONTAIN LARGE AMOUNTS OF FILLERS, A PROCESS FOR PREPARING THEM AND THE USE THEREOF

(75) Inventors: Udo Görl, Recklinghausen (DE); Thomas Trempler, Maintal (DE); Reinhard Stober, Hasselroth (DE); Uwe Ernst, Marl (DE)

(73) Assignee: PKU Pulverkautschuk Union GmbH, Marl (DE)

( * ) Notice: Subject to any disclaimer, the term of this patent is extended or adjusted under 35 U.S.C. 154(b) by 0 days.

(21) Appl. No.: 09/576,179

(22) Filed: May 23, 2000

(30) Foreign Application Priority Data

May 27, 1999 (DE) .......................... 199 24 366

(51) Int. Cl.[7] .............................. C08L 3/36
(52) U.S. Cl. ................ 524/492; 524/495; 524/442; 524/437; 524/436; 524/261; 524/262; 524/263; 524/264; 524/265; 524/267; 523/333; 523/334; 523/206; 428/403; 428/407
(58) Field of Search ................. 528/489; 524/436, 524/265, 392, 444, 419, 437

(56) References Cited

U.S. PATENT DOCUMENTS

| | | | | |
|---|---|---|---|---|
| 4,250,082 A | * | 2/1981 | Somer et al. ............ 260/42.55 |
| 4,704,414 A | * | 11/1987 | Kerner et al. ............... 523/213 |
| 4,788,231 A | * | 11/1988 | Smigerski et al. .......... 523/334 |
| 4,828,714 A | * | 5/1989 | Smigerski ................... 210/710 |
| 4,883,829 A | * | 11/1989 | Smigerski et al. ............. 53/334 |
| 5,116,886 A | * | 5/1992 | Wolff et al. ................. 523/209 |
| 5,159,009 A | * | 10/1992 | Wolff et al. ................. 524/495 |
| 5,216,055 A | * | 6/1993 | Goerl et al. ................. 524/188 |
| 6,277,908 B1 | * | 8/2001 | Yamamoto .................. 524/436 |
| 6,340,724 B1 | * | 1/2002 | Gorl et al. .................. 524/442 |
| 6,548,584 B1 | * | 4/2003 | Gorl et al. .................. 524/413 |

FOREIGN PATENT DOCUMENTS

DE 37 23 214 1/1989

OTHER PUBLICATIONS

Gorl, U.; Nordsiek, K.–H. KGK Kautschuk Gummi Kunststoffe, 1998, No. 4, 250–252, 254–256, and 258.*

Gorl et al., "Rubber/Filler Batches in Powder Form", Kautschuk und Gummi–Kunststoffe, DE, Dr. Alfred Huthig Verlag GmbH, Heidelberg, Bd. 51, No. 4 (Apr. 1998), pp. 250–252, 254–256 and 258.

* cited by examiner

Primary Examiner—David W. Wu
Assistant Examiner—Rip A. Lee
(74) Attorney, Agent, or Firm—Pillsbury Winthrop, LLP

(57) ABSTRACT

Rubber powders with a high degree of filling are obtained by precipitating water-containing suspensions which contain fillers and rubber emulsions or rubber solutions. Use thereof to prepare vulcanizable rubber mixtures.

15 Claims, No Drawings

RUBBER POWDERS WHICH CONTAIN LARGE AMOUNTS OF FILLERS, A PROCESS FOR PREPARING THEM AND THE USE THEREOF

CROSS-REFERENCE TO RELATED APPLICATION

This application is based on German Application DE 199 24 366.2, filed May 27, 1999, which disclosure is incorporated herein by reference.

FIELD OF THE INVENTION

The invention provides a process for preparing rubber powders which contain large amounts of siliceous fillers modified with organosilicon compounds and/or carbon black, the rubber powders prepared in this way and use thereof.

BACKGROUND OF THE INVENTION

The production of rubber powders containing small amounts of filler is already known in principle (DE-PS 37 23 213, still unpublished DE-198 43 301.8). These products are generally obtained via stepwise precipitation of an aqueous emulsion which contains a filler (e.g., precipitated silica) and a rubber latex.

In these products the rubber is intended to form the main proportion or at least the essential proportion as compared with the filler (e.g. silica and/or carbon black). The amount of filler is preferably chosen so that it corresponds to the concentration in a conventional rubber mixture.

Interest in the processing technique for these powdered products has been shown by the rubber industry as such rubber mixtures are produced with high time, energy and manpower requirements. The main reason for this is that the rubber raw material is present in the form of bales and the other constituents of the vulcanizable mixtures have to be admixed in several process stages using rollers or internal mixers.

Rolling resistance of vehicle tires (which produces savings in gas consumption) and wet-sliding behavior have been improved since the start of the 1990s by the use of highly active precipitated silicas combined with bifunctional organosilanes in tire mixtures. See DE-OS 43 34 201.9 and DE-OS 44 27 137.9.

Bis-(triethoxysilylpropyl)tetrasulfane (TESPT) is the most important compound used for this application.

TESPT reacts with the silanol groups in the silica via its triethoxysilyl groups during preparation of the mixtures.

During this so-called silanization or modification reaction, ethanol is released in stoichiometric amounts, which may require considerable safety precautions in the workplace if this reaction does not take place until the rubber mixtures are being prepared.

The rubber industry is therefore making an effort to find a remedy in the near future. One possibility comprises the installation of plants for suction and post-incineration or the incorporation of biofilters. Since this has to be done for each compounding line, however, the costs are correspondingly high. A second possibility requires the raw materials suppliers to perform the silanization reaction, i.e. the reaction between silica and silane, collecting the alcohol being released and disposing of it or recycling it.

Processes for the modification of siliceous fillers, including precipitated highly active silicas, are known from the literature. None of these products has penetrated the market, however, for economic reasons and, primarily, for technical reasons.

EP 0 442 1433 B1 provides a process in which the silane is applied to dry silica and then reacted at elevated temperature with the release of ethanol. Apart from the economic disadvantage of using pre-dried silica as starting material, an additional disadvantage is due to the inadequate storage stability of the products prepared in this way and thus the ongoing deterioration of the rubber-engineering characteristics.

Another possibility for preparing pre-modified silicas is wet silanization. EP 0 177 674 provides a process in which silica and silane are homogenized with the aid of a special emulsifier and then the reaction is performed at elevated temperature with simultaneous drying of the product. In U.S. Pat. No. 3,567,680, special water-soluble mercaptosilanes are described as suitable for the reaction.

As shown in practice, however, products prepared by this process are also not very storage stable. Tests have shown, in both processes, that it is difficult for TESPT, in particular when used in large amounts, to fully react with the OH groups on the silica surface. This unreacted portion of silane tends to self-polymerize during storage and cannot then be used for the desired modification of the silica. As a result, the rubber-engineering characteristics are reduced. In the case of silanization in water, in accordance with EP 0 177 674, silica particles agglomerate strongly in water and therefore particle sizes suitable for the silanization process are not present, especially at high suspension densities. If this type of pre-modified product is incorporated, mechanical degradation of the particles takes place and silica particles which have not been modified or are insufficiently modified are released. The result is a distinct decrease in the properties relating to rubber-engineering characteristics.

The unreacted proportions of silane are one reason for the aging behavior of silanized silicas, especially those silanized with TESPT. This makes a new approach to the preparation of pre-modified products desirable. DE 196 09 619.7 undertakes the task of clearly increasing the degree of reaction of the silane, inter alia TESPT, i.e. reacting as many of the ethoxy groups as possible. This is possible by reducing the pH to a range of pH between 2 and 5. Rapid and comprehensive reaction of the silane with the silica takes place in this pH range.

As shown in practice, the silane tends to self-polymerize at a low pH. That means that the silica is not modified in the desired manner and furthermore that the rubber-engineering characteristics are unsatisfactory.

To summarize, the following problems in particular need to be avoided in their entirety or solved.

Reducing the agglomeration behavior of silica during silanization;

Avoiding self-polymerization of the silane; and

Complete reaction of the silane with the siliceous surface.

SUMMARY OF THE INVENTION

The object of the invention is to provide a process for preparing a rubber powder which contains a large amount of filler, in particular precipitated silica and/or carbon black, these rubber powders and the use thereof.

The invention provides a process for preparing finely divided rubber or rubber powders by precipitation from a water-containing mixture which contains oxidic, in particular siliceous, fillers and/or carbon black in the form of suspensions, an aqueous emulsion of a rubber (polymer) or a rubber solution, by adding water-soluble salts of a metal selected from groups IIa, IIb, IIIa and VIII of the Periodic System of Elements, in which:

a) first, a filler suspension with a suspension density between 0.5 and 10%, in particular between 5 and 7%, with respect to the solids, is prepared from a siliceous compound and/or carbon black by stirring, the solid particles optionally having been previously milled down (deagglomerated) by means of a suitable mill. Additional hydrogen bridge-forming compounds such as polyalcohols or polyvalent amines are optionally added to the suspension in amounts of 0.5 to 10 parts, with respect to 100 parts of filler, and the suspension is optionally heated to within the range from 25° to 95° C., b) then, if the suspension contains siliceous fillers, one or more organosilicon compound(s) in accordance with formulae (I) to (III) which contain at least one alkoxy group are dissolved in water or optionally emulsified in water in the presence of a surface active substance, and mixed with the aqueous suspension of filler mentioned above or its mixture with a carbon black, at a temperature of 10° to 60° C., preferably at room temperature, with stirring, c) this suspension, prepared in this way, is mixed with a polymer latex, polymer emulsion or polymer solution. The pH of this mixture is reduced with an acid or with the aqueous solution of one of the salts mentioned above, in particular a Lewis acid, to a value between 7 and 4, preferably between 5.5 and 4.5, and the rubber in the mixture is precipitated together with the fillers optionally modified by the organosilicon compounds mentioned above, d) the precipitated solid is separated using known methods and e) the filler-containing rubber is dried.

It is also possible to use siliceous fillers already pre-modified with the organosilicon compounds mentioned above.

Hexanetriol, glycol, diethylene glycol, triethylene glycol or POLYWAX 4000 (a long-chain hydrocarbon) are preferably used as polyols. O-toluyl-biguanidine, hexa-K, DOTG (di-o-toluylguanidine), DPG (diphenylguanidine) or TEA (triethanolamine), for example, are suitable as polyvalent amines.

In a preferred embodiment, an aqueous plastics emulsion containing polystyrene, polystyrene/butadiene copolymers of various compositions, polyethylenes, polypropylenes or polyvinyl acetate of different chemical constitutions is also added to the powdered rubber in the aqueous medium, prior to separating and drying, in amounts of 0.5–10 phr, in particular 1–4 phr. These form a coating during the drying process which prevents the absorption of water.

The ratios by weight in the suspension are adjusted so that a powdered rubber with a filler content of >250 phr, preferably ≧400 phr precipitates out.

The drying process is advantageously performed in a dryer with a gas inlet temperature of 130° to 170° C. and a gas outlet temperature of 50° to 70° C. The temperature of the product should not exceed 40° to 80° C. The duration and extent of the precipitation process, which depends on the pH and the concentration of filler, may readily be established by a series of measurements.

The products are produced as a free-flowing powder without further additional measures to prevent adhesion. Quantitative determination of the sulfur atoms contained in the silane in accordance with formula (I) before and after extraction of the powdered rubber with hot ether show, for example, that the silane used for modification purposes is present virtually fully chemically bonded to the silica.

Carbon blacks known in the rubber industry are optionally used as further fillers, preferably in a finely divided form. These carbon blacks generally have an average particle diameter, without mechanical treatment, of 1 to 9 $\mu$m, preferably 1 to 8 $\mu$m, before being suspended.

Precipitated silicas may advantageously be used in the form of a salt-free washed filter cake.

Suitable metal salts are those which arise from elements in groups IIa, IIb, IIIa, and VIII of the Periodic System of Elements. This group classification corresponds to that of the old IUPAC recommendation (see: Periodisches System der Elemente, Verlag Chemie, Weinheim, 1985). Typical salts are magnesium chloride, zinc sulfate, aluminum chloride, aluminum sulfate, iron chloride, iron sulfate, cobalt nitrate and nickel sulfate; salts of aluminum are preferred. Aluminum sulfate and other Lewis acids are particularly preferred. The salts are used in an amount of 0.1 to 6.5 parts by weight per 100 parts by weight of rubber.

Additional mineral acids such as e.g. sulfuric acid, phosphoric acid and hydrochloric acid are optionally used to adjust to the desired pH; sulfuric acid is particularly preferred. However, carboxylic acids such as e.g. formic acid and acetic acid, may also be used.

The amount of acid is governed by the type and amount of water-soluble metal salt, the filler, the organosilane used and the optionally present alkali metal silicate. The amount can readily be determined by trial runs. The solids content of the latices used is generally 20 to 25 wt. %. The solids content of the rubber solutions is generally 3 to 20 wt. % and that of the rubber emulsions is generally 5 to 60 wt. %.

The process according to the invention may be performed either batchwise or continuously. The precipitated rubber powder is advantageously first separated from the majority of the water. This can be achieved, for example, by using a centrifuge, a filter press or a decanter. Then the product is dried to a residual moisture content of <1%. This is advantageously achieved using a relatively fast drying process, for example a fluidized bed dryer. However, it is also possible to transport the precipitated rubber powder directly to a dryer, e.g. a spray dryer, without previously separating the water, and optionally granulating the product.

Rubber powders according to the invention, which are also provided by the process of the invention, are generally prepared, if siliceous or oxidic fillers, in particular precipitated silicas, are used, by using one or more organosilicon compounds of the general formulae $$\{R^1{}_n(RO)_{3-n}Si\text{-}(Alk)_m\text{-}(Ar)_p\}_q\{B^1\} \qquad (I),$$

$$R^1{}_n(RO)_{3-n}Si\text{-}(Alkyl) \qquad (II),$$

or $$R^1{}_n(RO)_{3-n}Si\text{-}(Alkenyl) \qquad (III),$$

in which $B^1$: represents —SCN, —SH —Cl, NH$_2$ (when q=1) or —S$_x$— (when q=2)

R and $R^1$: represent an alkyl group with 1 to 4 carbon atoms, which is branched or unbranched, or a phenyl group, wherein all the groups R and $R^1$ are identical or different and preferably represents an alkyl group, R: may also represent a C$_1$–C$_4$-alkyl or —C$_1$–C$_4$-alkoxy group, which is branched or unbranched n: is 0, 1 or 2, Alk: represents a divalent straight or branched hydrocarbon group with 1 to 6 carbon atoms, m: 0 or 1

Ar: represents an arylene group with 6 to 12 carbon atoms p: is 0 or 1, with the proviso that p, m and n are not simultaneously 0, x: is a number from 2 to 8, Alkyl: represents a monovalent straight or branched saturated hydrocarbon group with 1 to 20 carbon atoms, preferably 2 to 8 carbon atoms, Alkenyl: represents a monovalent straight or branched unsaturated hydrocarbon group with 2 to 20 carbon atoms, preferably 2 to 8 carbon atoms.

These compounds are generally used in the form of solutions, if the compounds are water-soluble, or emulsions. The solutions or emulsions may also be formed in the presence of the suspension of siliceous fillers or their mixtures with carbon black.

The emulsions or solutions are preferably prepared at room temperature. However, temperatures of 10° to 60° C. are also suitable. The concentration of the organosilicon compound(s) in the solutions or suspension used is 0.5 to 20 wt. %, preferably 5 to 12 wt. %, with respect to the total amount of siliceous filler used.

The pH of the emulsion or solution, as is the pH of the filler suspension after admixing the emulsion, is in the weakly acid or weakly alkaline region, but is preferably about 7.

The expression "water-insoluble" is understood to mean that:

after mixing the organosilicon compound (without a surface active substance) with the suspension of the filler, clear solution is not formed around the filler particles in the desired pH and concentration region. Rather, the separate phases remain, these consisting of water, solid and organosilicon compound(s).

The oligosulfidic organosilanes in accordance with general formula (I) cited above are known per se and can be prepared by known processes. Examples of preferably used organosilanes are e.g. bis(trialkoxysilyl-alkyl)oligosulfides which can be prepared according to U.S. Pat. No. 3,842,111, such as bis-(trimethoxy-, triethoxy-, trimethoxyethoxy-, tripropoxy-, tributoxy-, tri-i-propoxy and tri-i-butoxy-silyl-methyl)-oligosulfides, in particular the di-, tri-, tetra-, penta-, hexasulfides etc., also bis-(2-trimethoxy-, triethoxy-, trimethoxyethoxy-, tripropoxy- and -tri-n- and -i-butoxy-ethyl)-oligosulfides, in particular the di-, tri-, tetra-, penta-, hexasulfide etc., furthermore bis-(3-trimethoxy-, triethoxy-, trimethoxyethoxy-, tripropoxy-, tri-n-butoxy- and tri-i-butoxysilyl-propyl)-oligosulfides, particularly the di-, tri-, tetrasulfides etc. up to octasulfides, and the corresponding bis-(3-trialkoxy-silylisobutyl)-oligosulfides and the corresponding bis-(4-trialkoxysilylbutyl)-oligosulfides. Of these selected, relatively simply constructed organosilanes of the general formula (I), preferred compounds are the bis-(3-trimethoxy-, triethoxy- and tripropoxysilylpropyl)-oligosulfides, particularly the di-, tri-, tetra- and pentasulfides, in particular triethoxy compounds with 2, 3 or 4 sulfur atoms and their mixtures. Alk in general formula I represents a divalent, straight or branched hydrocarbon group with 1 to 6 carbon atoms, preferably a saturated alkylene group with a straight carbon chain with 1 to 4 carbon atoms.

Silanes with the following structural formula are especially suitable:

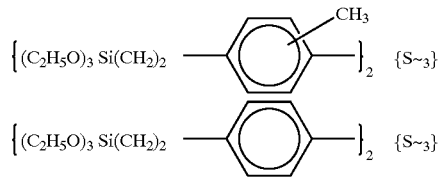

and their methoxy analogs, which can be prepared in accordance with DE-AS 25 58191. These compounds are not water-soluble.

Surface active substances which are generally used, and in this case are preferred, are non-ionogenic, cationic and anionic surfactants, the concentration of these in the emulsion is 1 to 15 wt. %, preferably 2 to 10 wt. %, with respect to the amount of organosilane compounds.

Examples of these types of surfactants are alkylphenol polyglycol ethers, alkyl polyglycol ethers, polyglycols, alkyltrimethylammonium salts, dialkyldimethylammonium salts, alkylbenzyltrimethylammonium salts, alkylbenzene sulfonates, alkyl hydrogen sulfates, alkyl sulfates.

The natural or precipitated oxidic or siliceous fillers to be modified, also used as a mixture of two or more of these fillers, are fillers known in rubber technology. An essential prerequisite for their suitability is the presence of OH groups at the surface of the filler particles which can react with alkoxy groups in the organosilicon compounds. They are oxidic and siliceous fillers which are compatible with rubbers and have the degree of fineness demanded and known for this use.

Suitable natural silicates are, in particular, kaolin or clays. However, kieselguhr or diatomaceous earths may also be used.

Oxidic fillers which may be mentioned by way of example are aluminium oxide, aluminium hydroxide or trihydrate and titanium dioxide.

"Modified fillers" in this connection means that the organosilicon compounds are bonded either by chemical reaction (OH groups) or adsorptively at the surface.

Adsorptively bonded groups are converted into chemically bonded groups at the latest during the drying stage.

The emulsion or solution is mixed with the filler suspension in amounts such that the concentration of organosilicon compound is 0.5 to 20 wt. %, preferably 5 to 12 wt. %, with respect to the amount of filler. The modified filler contains 0.5 to 20 wt. %, preferably 0.5 to 12 wt. % of organosilicon compound, with respect to the dry filler.

The fillers are particularly suitable for use in vulcanizable and moldable rubber mixtures.

A salt-free washed filter cake obtained from silica precipitation is advantageously used for the process according to the invention.

Also suitable are suspensions such as are obtained during the working up of natural fillers such as clays.

An energy-consuming drying step is avoided in this way, as compared with the prior art.

The silicas used are known from the rubber art.

These silicas generally have a $N_2$ surface area, determined by the well-known BET method, of 35 to 700 $m^2$/g, a CTAB surface area of 30 to 500 $m^2$/g and a DBP index of 150 to 400 ml/100 g.

The product according to the invention contains these silicas in an amount of >250 to 5000 parts, preferably in an amount of 400 to 1000 parts, with respect to 100 parts of rubber.

White, natural fillers, such as clays or silica chalks with a $N_2$ surface area of 2 to 35 $m^2/g$, are preferably used in an amount of 400 to 1250 parts, with respect to 100 parts of rubber.

Filler-containing rubber powders may also be prepared which contain siliceous fillers, in particular silicas, and carbon black as a mixture, or which contain only carbon black. The total amount of filler may then be between >250 and 5000 phr, in particular up to 2000 phr. The proportion of silica, if present, is generally >250 phr to 1250 phr.

For degrees of filling of >1000 phr, carbon black is chosen in particular as the filler; carbon black is generally used at a rate of >250 to 1000 phr.

Carbon blacks which are generally used in rubber processing are especially suitable.

These include furnace blacks, gas blacks and lamp blacks with an iodine absorption index of 5 to 1000 $m^2/g$, a CTAB index of 15 to 600 $m^2/g$, a DBP adsorption of 30 to 400 ml/100 g and a 24 M4 DBP index of 50 to 370 ml/100 g.

The following species have proved usable as types of rubber and can be prepared as aqueous emulsions, separately or as mixtures with each other:

Natural rubber, emulsion SBR with a styrene proportion of 10 to 50%, butyllacrylonitrile rubber.

Butyl rubber, terpolymers of ethylene, propylene (EPM) and non-conjugated dienes (EPDM), butadiene rubbers, SBR, prepared by the solution polymerization process, with styrene contents of 10 to 25%, and also concentrations of 1,2-vinyl constituents of 20 to 55% and isoprene rubber, in particular 3,4-polyisoprene.

Emulsion SBR and solution SBR are particularly suitable.

In the case of polymers prepared by the solution process, special precautions have to be taken during processing due to the presence of solvent.

Apart from the rubbers mentioned above, the following elastomers are suitable, individually or as a mixture:

Carboxyl rubber, epoxide rubber, trans-polypentenamers, halogenated butyl rubber, rubbers made from 2-chlorobutadiene, ethylene/vinyl acetate copolymers, epichlorohydrins, optionally also modified natural rubber such as e.g. epoxidized types. Rubber powders according to the invention generally have a particle size of 25 µm to 3000 µm, in particular 500 µm to 1000 µm, and may optionally contain, in addition to the fillers already mentioned, processing or vulcanizing aids known in the rubber processing industry such as zinc oxide, zinc stearate, stearic acid, polyalcohols, polyamines, plasticizers, anti-aging agents which protect against heat, light or oxygen and ozone, reinforcing resins, flame retardants such as e.g. $Al(OH)_3$ and $Mg(OH)_2$, pigments, various cross-linking chemicals and optionally sulfur, in concentrations which are conventionally used in the rubber industry. These are preferably added to the suspensions which contain fillers before precipitating the rubber powder, naturally taking account of their pH stability.

According to the invention, finely divided rubber powders which contain siliceous fillers which are modified with organosilicon compounds and/or carbon black can be prepared which can be used in this form in combination with any common types of rubber as a reinforcing filler. Powdered rubbers which contain silanized silicas are characterized in particular by high storage stability, are easy to process without the noticeable emission of alcohol and lead to exceptional rubber-engineering characteristics for the vulcanizates prepared when these powdered rubbers are used.

Using the present invention, a new development has been made which includes the provision of a polymer-bonded, optionally modified, filler in the rubber processing industry.

In contrast to classical mixing processes, degrees of filling with highly active silica fillers of >250 phr, in particular between 400 and 1250 phr, can be achieved only with the aid of powdered rubber technology. This means that, after precipitation, each filler particle is still surrounded by a thin layer of rubber, despite the high degree of filling. In this case, we can refer to coating the filler with the polymer. A non-dusty filler is obtained in this way, and this is optionally provided with a water repellent coating and can be used in the classical mixing process and can be incorporated into any rubber.

DETAILED DESCRIPTION OF THE PREFERRED EMBODIMENTS

In the following examples, the ability to perform the invention and the advantages of the present invention are explained without restricting the invention to the features described below.

Raw Materials Used During Preparation

| | |
|---|---|
| E-SBR | Emulsion styrene/butadiene latex with a 23.5% styrene concentration (BSL) |
| Si 69 | Bis(triethoxysilylpropyl)tetrasulfane (Degussa-Hüls AG) |
| Si 75 | Bis(triethoxysilylpropyl)disulfane (Degussa-Hüls AG) |
| ULTRASIL 7000 | precipitated sulfur with a $N_2$ surface area (BET) of 175 $m^2/g$ and improved dispersion properties (Degussa-Hüls AG), dried or as filter cakes |
| MARLIPAL 1618/25 | Emulsifier: fatty alcohol polyethylene glycol ether |

EXAMPLE I

Preparing a rubber powder using E-SBR, ULTRASIL 7000 and Si 69 (EPB I)

A stable suspension is prepared from 22.5 kg of ULTRASIL 7000 filter cakes, 1.8 kg of Si 69 and 0.225 kg of MARLIPAL 1618/25 in 272 l of water, with stirring.

Then this suspension is mixed with 13.62 kg of a 21% strength E-SBR latex emulsion, E-SBR-1500, with vigorous stirring and then the pH is reduced to a value of 5.0 by adding a 10% strength $Al_2(SO_4)_3$ solution.

After the precipitation process, a major part of the water is mechanically separated, followed by a drying stage, down to a residual moisture content of the solid phase of <1%. The powdered, free-flowing product contains 100 parts of E-SBR, 750 parts of silica and 8 parts of Si 69, with respect to 100 parts of silica. The reaction is performed in such a way that the silane is fully bonded to the silica.

EXAMPLE II

Preparing a powdered rubber using E-SBR, ULTRASIL 7000 filter cakes and Si 75

A stable suspension of 103 kg of ULTRASIL 7000 filter cakes, 1.8 kg of Si 75 and 0.225 kg of MARLIPAL 1618/25 in 272 l water is prepared, with stirring.

The suspension is then mixed with 13.71 kg of a 21% strength E-SBR latex emulsion with vigorous stirring and then the pH is reduced to a final value of 5.0 by adding a 10% strength $Al_2(SO_4)_3$ solution. After the precipitation process, mechanical separation of the water is performed, followed by a drying stage down to a residual moisture content of <1%.

The powdered product contains 100 parts of E-SBR, 750 parts of silica, 8 parts of Si 75, with respect to 100 parts of silica. The reaction is performed in such a way that the silane is fully bonded to the silica.

The following products were used in a rubber-engineering application:

Chemicals

| | |
|---|---|
| E-SBR 1500 | styrene/butadiene rubber with a concentration of 23.5% of styrene |
| NAFTOLEN ZD | aromatic mineral oil plasticizer |
| EPB I | powdered rubber, consisting of 100 parts of E-SBR 1500, 750 parts of ULTRASIL 7000 reacted with 8 parts of Si 69 with respect to 100 parts of silica |
| 6 PPD | N-(1,3-dimethylbutyl)N-phenyl-p-phenylene diamine |
| CBS | benzothiazyl-2-cyclosulfenamide |
| DPG | diphenylguanidine |
| TBZTD | tetrabenzylthiuram disulfide |
| BUNA VSL 5025-1 | oil-extended solution-SBR with 50% of 1,2-vinyl units and 25% styrene (Bayer AG) |
| BUNA CB 24 | butadiene rubber (cis > 96%) (Bayer AG) |

The following rubber engineering test methods were used:

| | |
|---|---|
| Mooney viscosity | DIN 53 523/3 |
| Tensile test | DIN 53 504 |
| Modulus, 300% | DIN 53 504 |
| Modulus, 300/100% | |
| Shore hardness | DIN 53 505 |
| Dispersion (Philips) | ISO/DIN 11 345 |
| Extension at break | DIN 53 504 |
| Vulcameter curve | DIN 53 529 |
| Ball rebound | ASTM D 5308 |
| Viscoelastic properties | DIN 53 513 |

EXAMPLE A

A comparison of the rubber engineering characteristics of the product of Example 1 according to the invention (Formulation 2) against a standard conventional mixture (Formulation 1).

| Formulation | 1 (Standard) | 2 (Invention) |
|---|---|---|
| BUNA VSL 5025-1 | 81.3 | 81.3 |
| BUNA CB 24 | 30 | 30 |
| E-SBR | 10 | — |
| EPB I | — | 97.6 (10 parts of E-SBR) |
| ULTRASIL 7000 GL | 80 | — |
| Si 69 | 6.4 | — |
| ZnO RS | 3 | 3 |
| Stearic acid | 2 | 2 |
| NAFTOLEN ZD | 14 | 14 |
| 6 PPD | 1.5 | 1.5 |
| Wax | 1 | 1 |
| DPG | 2 | 2 |
| CBS | 1.5 | 1.5 |
| TBZTD | 0.2 | 0.2 |
| sulfur | 1.5 | 1.5 |

Mixing Process

Stage

Internal mixer: GK 1.5 E; volume 1.5 l;
friction 1:1; punch 5.5 bar

| Mixture formulation | 1 (Standard) | 2 (Invention) |
|---|---|---|
| Degree of filling | 0.55 | 0.55 |
| RPM | 50 | 50 |
| Throughput temperature (° C.) | 60 | 60 |
| 0–0.5 | BUNA VSL 5025-1, BUNA CB 24, E-SBR | 0–0.5 BUNA VSL 5025-1, BUNA CB 24 |
| 0.5–1' | ½ ULTRASIL 7000 ½ Si 69, Oil, ZnO, Stearic acid, Wax | ½ EPB 1, Oil, ZnO Stearic acid, Wax |
| | 6 PPD | 6 PPD |
| 1–2' | ½ ULTRASIL 7000 ½ Si 69, 6 PPD | ½ EPB1 |
| 2' | Cleaning | Cleaning |
| 2–4' | Mixing and discharging | Missing and discharging |
| | Discharge temperature ~145° C. | Discharge temperature ~145° C. |

Stage

Internal mixer: GK 1.5 E; volume 1.5 I; Friction 1:1
Punch 5.5 bar; RPM 40; degree of filling 0.53;
Throughput temperature 60° C.

Both mixtures
0–3' Mix batch from stage 1 and discharge
Discharge temperature: ~135° C.

Stage

Internal mixer: GK 1.5 E; volume 1.5 I; Friction 1:1;
Punch 5.5 bar; RPM 30; degree of filling 0.52;
Throughput temperature 60° C.

Both mixtures
0–1.5 Batch from stage 2, accelerator, sulfur
1.5' Discharge and draw out a sheet Rubber Engineering Data
Vulcanization: 165° C., 15'

| | 1 (Standard) | 2 (Invention) |
|---|---|---|
| Dmax–Dmin (Nm) | 15.61 | 15.93 |
| Dmin (Nm) | 2.23 | 2.01 |
| t10% (min) | 1.6 | 1.5 |
| t90 (min) | 6.5 | 6.6 |
| Tensile strength (Mpa) | 13.6 | 16.2 |
| Modulus, 300% (Mpa) | 8.4 | 8.5 |
| Modulus, 300/100 | 4.9 | 5.0 |
| Extension at break (%) | 420 | 490 |
| Shore A hardness | 62 | 62 |
| Ball Rebound RT (%) | 35.8 | 38.7 |
| Dispersion (Philips) | 8 | 8 |
| E' 0° C. (MPA) | 17.0 | 14.6 |
| E" 0° C. (MPA) | 7.5 | 6.3 |
| tan δ 0° C. | 0.445 | 0.430 |
| E' 60° C. (MPA) | 8.0 | 7.2 |
| E" 60° C. (MPA) | 1.0 | 1.0 |
| tan δ 60° C. | 0.131 | 0.136 |

With the vulcanizates prepared using the products according to the invention (Formulation 2), rubber engineering testing shows that, as compared with a standard product, higher strength and extension at break values and also excellent dynamic data are found. In contrast to the standard example, almost no ethanol production occurred when using the powdered rubbers of the inventon.

What is claimed is:

1. A rubber powder, containing one or more oxidic or siliceous fillers, comprising at least one member selected from the group consisting of synthetic fillers in an amount of 400 phr to 5000 phr and naturally occurring fillers in an amount of 400 phr to 5000 phr; and carbon black in an amount of 400 phr to 5000 phr, wherein the total amount of the fillers and carbon black does not exceed 5000 phr;

wherein the surface of said oxidic or siliceous fillers is modified with one or more organosilicon compounds of the formulae:

$$\{R^1{}_n(RO)_{3-n}Si\text{-}(Alk)_m\text{-}(Ar)_p\}_q\{B^1\} \qquad (I),$$

$$R^1{}_n(RO)_{3-n}Si\text{-}(Alkyl) \qquad (II),$$

or $$R^1{}_n(RO)_{3-n}Si\text{-}(Alkenyl) \qquad (III),$$

in which:

$B^1$: represents —SCN, —SH —Cl, $NH_2$ (when q=1) or —$S_x$— (when q=2),

R: represents an alkyl group with 1 to 4 carbon atoms, branched or unbranched, or a phenyl group, wherein all the groups R, $R^1$: represents a $C_1$–$C_4$-akyl or $C_1$–$C_4$-alkoxy group, branched or unbranched, or a phenyl group, wherein all the groups $R^1$ may be identical or different, n: is 0, 1 or 2, Alk: represents a divalent straight or branched hydrocarbon group with 1 to 6 carbon atoms, m: is 0 or 1, Ar: represents an arylene group with 6 to 12 carbon atoms, p: is 0 or 1, with the proviso that p, m and n are not simultaneously 0, x: is a number from 2 to 8, Alkyl: represents a monovalent straight or branched saturated hydrocarbon group with 1 to 20 carbon atoms, Alkenyl: represents a monovalent straight or branched unsaturated hydrocarbon group with 2 to 20 carbon atoms, wherein said rubber powder is prepared by the addition of the fillers to latex in one step, wherein the fillers are added as a filler suspension with a suspension density of from 0.5% to 10% with respect to the fillers, and wherein said powder is coated with a layer of polystyrene, polystyrene/butadiene copolymers, polyethylenes or polypropylenes.

2. The rubber powder according to claim 1, further comprising one or more processing or vulcanizing aids selected from the group consisting of zinc oxide, zinc stearate, stearic acid, polyalcohols, polyamines, plasticizer, anti-aging agents, reinforcing resins, flame retardant and sulfur.

3. The rubber powder according to claim 2, wherein the flame retardant comprises $Al(OH)_3$ or $Mg(OH)_2$.

4. The rubber powder according to claim 1, wherein said powder comprises particles that range in size from 25 µm to 3000 µm.

5. The rubber powder according to claim 1, wherein said one or more organosilicon compounds comprise a compound of formula (II), and wherein Alkyl: represents a monovalent straight or branched saturated hydrocarbon group with 2 to 8 carbon atoms.

6. The rubber powder according to claim 2, wherein said one or more organosilicon compounds comprise a compound of formula (III), and wherein Alkenyl: represents a monovalent straight or branched unsaturated hydrocarbon group with preferably 2 to 8 carbon atoms.

7. A rubber powder granulate comprising the rubber powder according to claim 1, wherein said granulate comprises particles that range in size from 2 mm to 10 mm.

8. A rubber powder, containing one or more oxidic or siliceous fillers, comprising at least one member selected from the group consisting of synthetic fillers in an amount of 400 phr to 5000 phr and naturally occurring fillers in an amount of 400 phr to 5000 phr; and carbon black in an amount of 400 phr to 5000 phr, wherein the total amount of the fillers and carbon black does not exceed 5000 phr;

wherein the surface of said oxidic or siliceous fillers is modified with one or more organosilicon compounds of the formulae:

$$\{R^1{}_n(RO)_{3-n}Si\text{-}(Alk)_m\text{-}(Ar)_p\}_q\{B^1\} \qquad (I),$$

$$R^1{}_n(RO)_{3-n}Si\text{-}(Alkyl) \qquad (II),$$

or $$R^1{}_n(RO)_{3-n}Si\text{-}(Alkenyl) \qquad (III),$$

in which:

$B^1$: represents —SCN, —SH —Cl, $NH_2$ (when q=1) or —$S_x$— (when q=2),

R: represents an alkyl group with 1 to 4 carbon atoms, branched or unbranched, or a phenyl group, wherein all the groups R, $R^1$: represents a $C_1$–$C_4$-akyl or $C_1$–$C_4$-alkoxy group, branched or unbranched, or a phenyl group, wherein all the groups $R^1$ may be identical or different, n: is 0, 1 or 2, Alk: represents a divalent straight or branched hydrocarbon group with 1 to 6 carbon atoms, m: is 0 or 1, Ar: represents an arylene group with 6 to 12 carbon atoms, p: is 0 or 1, with the proviso that p, m and n are not simultaneously 0, x: is a number from 2 to 8, Alkyl: represents a monovalent straight or branched saturated hydrocarbon group with 1 to 20 carbon atoms, Alkenyl: represents a monovalent straight or branched unsaturated hydrocarbon group with 2 to 20 carbon atoms, wherein said rubber powder is prepared by the addition of the fillers to latex in one step wherein the fillers are added as a filler suspension with a suspension density of from 0.5% to 10% with respect to the fillers, and wherein said powder comprises particles that range in size from 25 µm to 3000 µm.

9. The rubber powder according to claim 8, wherein said powder is coated with a layer of polystyrene, polystyrene/butadiene copolymers, polyethylenes or polypropylenes.

10. The rubber powder according to claim 8, further comprising one or more processing or vulcanizing aids selected from the group consisting of zinc oxide, zinc stearate, stearic acid, polyalcohols, polyamines, plasticizer, anti-aging agents, reinforcing resins, flame retardant and sulfur.

11. The rubber powder according to claim 10, wherein the flame retardant comprises $Al(OH)_3$ or $Mg(OH)_2$.

12. The rubber powder according to claim 8, wherein said one or more organosilicon compounds comprise a compound of formula (II), and wherein Alkyl: represents a monovalent straight or branched saturated hydrocarbon group with 2 to 8 carbon atoms.

13. The rubber powder according to claim 8, wherein said one or more organosilicon compounds comprise a compound of formula (III), and wherein Alkenyl: represents a monovalent straight or branched unsaturated hydrocarbon group with preferably 2 to 8 carbon atoms.

14. A rubber powder granulate comprising the rubber powder according to claim 8, wherein said granulate comprises particles that range in size from 2 mm to 10 mm.

15. A rubber powder granulate comprising a rubber powder, containing one or more oxidic or siliceous fillers, comprising at least one member selected from the group consisting of synthetic fillers in an amount of 400 phr to 5000 phr and naturally occurring fillers in an amount of 400 phr to 5000 phr; and carbon black in an amount of 400 phr to 5000 phr, wherein the total amount of the fillers and carbon black does not exceed 5000 phr;

wherein the surface of said oxidic or siliceous fillers is modified with one or more organosilicon compounds of the formulae:

$$\{R^1{}_n(RO)_{3-n}Si\text{-}(Alk)_m\text{-}(Ar)_p\}_q\{B^1\} \quad (I),$$

$$R^1{}_n(RO)_{3-n}Si\text{-}(Alkyl) \quad (II),$$

or $$R^1{}_n(RO)_{3-n}Si\text{-}(Alkenyl) \quad (III),$$

in which:

$B^1$: represents —SCN, —SH —Cl, $NH_2$ (when q=1) or —$S_x$— (when q=2),

R: represents an alkyl group with 1 to 4 carbon atoms, branched or unbranched, or a phenyl group, wherein all the groups R, $R^1$: represents a $C_1$–$C_4$-akyl or $C_1$–$C_4$-alkoxy group, branched or unbranched, or a phenyl group, wherein all the groups $R^1$ may be identical or different, n: is 0, 1 or 2, Alk: represents a divalent straight or branched hydrocarbon group with 1 to 6 carbon atoms, m: is 0 or 1, Ar: represents an arylene group with 6 to 12 carbon atoms, p: is 0 or 1, with the proviso that p, m and n are not simultaneously 0, x: is a number from 2 to 8, Alkyl: represents a monovalent straight or branched saturated hydrocarbon group with 1 to 20 carbon atoms, Alkenyl: represents a monovalent straight or branched unsaturated hydrocarbon group with 2 to 20 carbon atoms, wherein said rubber powder is prepared by the addition of the fillers to latex in one step, wherein the fillers are added as a filler suspension with a suspension density of from 0.5% to 10% with respect to the fillers, and wherein said granulate comprises particles that range in size from 2 mm to 10 mm.

* * * * *